United States Patent [19]

Inoue

[11] 4,277,668

[45] Jul. 7, 1981

[54] HIGH-FREQUENCY POWER FEEDER CIRCUITRY AND SUPPLY METHOD FOR ELECTRICAL DISCHARGE MACHINING

[75] Inventor: Kiyoshi Inoue, Tokyo, Japan

[73] Assignee: Inoue-Japax Research Incorporated, Yokohama, Japan

[21] Appl. No.: 16,423

[22] Filed: Mar. 1, 1979

[30] Foreign Application Priority Data

Mar. 7, 1978 [JP] Japan .................................. 53-26332

[51] Int. Cl.³ .............................................. B23P 1/02
[52] U.S. Cl. ............................... 219/69 M; 219/69 C; 219/69 P
[58] Field of Search ................ 219/69 M, 69 P, 169 C

[56] References Cited

U.S. PATENT DOCUMENTS

| | | | |
|---|---|---|---|
| 2,856,565 | 10/1958 | Matulaitis | 219/69 C |
| 2,951,142 | 8/1960 | Ullmann | 219/69 C |
| 3,344,255 | 9/1967 | Ferguson | 219/69 C |
| 3,348,015 | 10/1967 | Rhyner et al. | 219/69 C |
| 3,614,368 | 10/1971 | Lobur | 219/69 P |
| 3,777,108 | 12/1973 | Maillet | 219/69 C |
| 3,943,321 | 3/1976 | Pfau et al. | 219/69 P |

*Primary Examiner*—C. C. Shaw
*Attorney, Agent, or Firm*—Karl F. Ross

[57] ABSTRACT

An EDM apparatus is fed with unidirectional pulses formed by a rectifier in proximity to the machining gap and energized via a conductive cable from a remote power source transmitting high-frequency current through the cable.

17 Claims, 4 Drawing Figures

HIGH-FREQUENCY POWER FEEDER CIRCUITRY AND SUPPLY METHOD FOR ELECTRICAL DISCHARGE MACHINING

FIELD OF THE INVENTION

The invention presently disclosed relates to a high-frequency power feeder circuitry and supply method for electrical discharge machining (EDM). More particularly, the invention concerns a method of and apparatus for supplying high-frequency electrical discharge machining pulses between a tool electrode and a workpiece across a machining gap which is flushed with a machining (dielectric) fluid in an electrical discharge machine.

BACKGROUND OF THE INVENTION

An electrical discharge machine is commonly equipped with a power supply for providing high-frequency machining pulses to the dielectric filled machining gap formed between the tool electrode and the workpiece in a dielectric containing or collecting work vessel. In conventional EDM power supply circuit arrangements and methods, machining power pulses are produced in a unit (power supply unit) provided separately from the machine proper which carries mechanical components and the work vessel in which the machining gap is defined between the tool electrode and the workpiece. The separate power supply unit is adapted to package in its cabinet all principal electrical components required to produce at its output a succession of unidirectional power pulses of a predetermined polarity relative to the tool electrode and the workpiece, the output of the unit being connected and hence the power pulses outgoing from the unit being transmitted to the machining gap by way of a elongated cable or line which must be provided. As a consequence, stray resistance and inductance included in the cable or line impede transmission of the unidirectional electric power and act to cause a considerable loss of power and distortion of pulse waveform transmitted to the machining gap. It has, therefore, been unavoidable for the material removal to be undesirably limited, for the machining efficiency to be unsatisfactorily low and for the entire power unit to become excessively large and bulky in conventional electrical discharge machines.

OBJECTS OF THE INVENTION

It is, accordingly, a principal object of the present invention to provide an improved machining power pulse supply method which permits an increased machining efficiency to be obtained, and renders the entire machining-pulse forming unit compact. Another important object of the present invention is to provide a power-pulse forming circuit arrangement which is compact and capable of providing an increased removal rate and efficiency.

SUMMARY OF THE INVENTION

In accordance with the present invention there is provided a method of supplying high-frequency electrical discharge machining pulses between a tool electrode and a workpiece across a machining gap flushed with a machining fluid in an electrical discharge machine, comprising the steps of: providing a high-frequency alternating electric power to the proximity of the machining gap along a feeder connecting said gap with a generator disposed remote from the machining gap for producing the high-frequency power; and rectifying the high-frequency alternating electric power in the proximity of the machining gap to form a succession of pulses of a given polarity relative to the tool electrode and the workpiece, constituting the electrical discharge machining pulses.

The frequency or repetition rate of the high-frequency electric power defining the frequency or repetition rate of the electrical discharge machining pulses is preferably in the range between 1 KHz and 5 MHz.

A circuit arrangement according to the present invention comprises: unidirectional current conducting means connected with the tool electrode and the workpiece in the proximity of the machining gap; a high-frequency alternating power generator disposed remote from the machining gap for providing a high-frequency alternating power at an output thereof; and a feeder for connecting the generator with the unidirectional current conducting means to allow the electric power produced at said output to be transmitted in the form of the high-frequency alternating electric current to the unidirectional means in proximity of the machining gap, the unidirectional current conducting means being adapted to rectify the high-frequency alternating electric power in said proximity to the machining gap to form a succession of pulses of a given polarity relative to the tool electrode and the workpiece, constituting the electrical discharge machining pulses.

The unidirectional current conducting means may be constituted by a half-wave rectifier or full-wave rectifier and the feeder may comprise a feeder line or cable, e.g., a coaxial cable in conventional design adapted to carry a high-frequency AC power. Further, a step-down transformer may be provided ahead of the unidirectional current conducting means along the feeder to establish a desired magnitude of the electrical machining pulses applied to the machining gap.

BRIEF DESCRIPTION OF THE DRAWING

These and other objects, features and advantages of the present invention will become more readily apparent from the following description, reference being made to the accompanying drawing in which.

SPECIFIC DESCRIPTION

Figure 1:
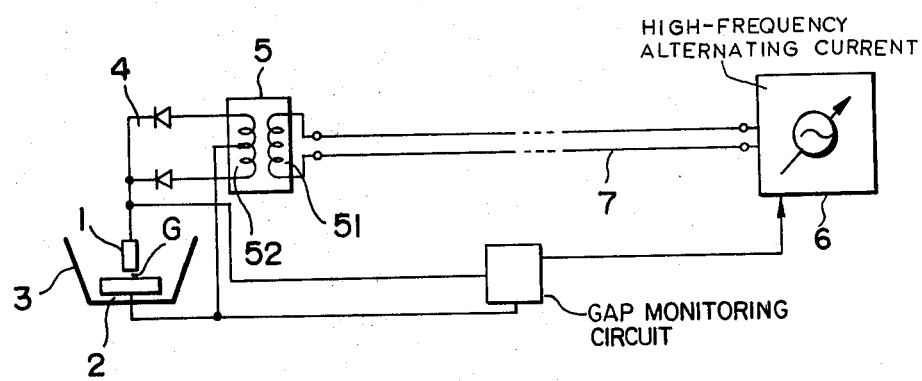
FIG. 1 is a circuit diagram schematically illustrating a certain embodiment for carrying out the principles of the present invention.

Referring to FIG. 1, a tool electrode 1 is shown juxtaposed with a workpiece 2 to form a machining gap G in a work vessel 3. The tool electrode 1 may take any of various forms, e.g. tubular or three-dimensional solid forms, depending upon a particular machining mode to be carried out. In travelling-wire or wire-cut electrical discharge machining (TW-EDM or WC-EDM), a wire or a like continuous elongate electrode is commonly utilized. The work vessel 3 is typically mounted upon a work table or base (not shown) and constitutes a part of an electrical discharge machine with the function to serve as a dielectric container or collector in which the machining gap G is defined. Any known dielectric fluid supply (not shown) is provided to deliver the machining fluid to the machining gap G so that the latter is filled and flushed with the machining fluid to carry away machining chips, tar and gases therefrom while serving as an EDM medium. During the machining operation, the tool electrode 1 is advanced relative to the workpiece 2 to maintain the gap G spacing therebetween constant by a servomechanism (not shown).

In accordance with an important feature of the present invention, unidirectional current conducting means or rectifier 4, shown constituted of a pair of diodes, is provided in the proximity of the machining gap G and each connected with the tool electrode 1 and the workpiece 2 via the center tap of the secondary winding 52 of a transformer 5. In this embodiment, the diodes 4 are arranged to perform a full-wave rectification of the output of the transformer 5. The primary winding 51 of the transformer 5 is connected to output terminals of a high-frequency alternating power generator 6 diagrammatically shown via a feeder 7 shown constituted by feeder line(s) or cable(s), e.g., a coaxial cable. The generator 6 constitutes a power supply unit which may have all its major components within a cabinet and is located for installation separately from the electrical discharge machine proper.

The generator provides an AC power of a frequency which ranges preferably between 1 KHz and 5 MHz that generally corresponds to a frequency or repetition rate of machining pulses transmitted by way of the feeder 7 and shaped by the rectifier 4 for application to the machining gap G. The transformer 5 serves to step down the voltage magnitude of the high-frequency output of the generator 6 and to set the pulse peak current at a desired value.

Thus, the high-frequency AC power produced by the generator 6 at a location remote from the machining gap G or the work vessel 3 is transmitted along the feeder 7 until it reaches the proximity of the gap G only where it is rectified by the element 4, with a desired polarity to become a succession of polarized or unidirectional machining pulses to be applied directly between the tool electrode 1 and the workpiece 2. The polarity of the electrode 1 and the workpiece 2 shown is such as to make the former anodic and the latter cathodic and this may be reversed according to the particular electrode material combinations and machining conditions or settings to be selected.

Since the machining power from the generator 6 is transmitted in the form of a high-frequency AC until it reaches the proximity of the machining gap G, there is little loss of power and distortion of the voltage or current waveform along the feeder 7, permitting machining at a high removal rate with a large electric power which can be transmitted with ease even at a frequency in the megacycle range. In addition, the low loss of power along the feeder 7 permits the generator 6 rendered compact and smaller in size and capacity.

The transformer 5 and the rectifier 4 can be mounted on a portion of the walls of the work vessel 3 or directly on the head, column or bed of the machine carrying the tool electrode 1 or the workpiece 2. The transformer 5 is advantageously of a small size since the power carried thereby is of a high-frequency. The rectification of the transformed high-frequency by the rectifier 4 in the proximity of the machining gap G provides polarized or unidirectional machining power pulses which are applied to the gap G without substantial power loss and waveform distortion.

Machining power pulses obtained by rectification of the high-frequency AC power may have an extremely narrow pulse duration $\tau$on of 1 to 100 microseconds and a pulse interval $\tau$off of 0.5 to 50 microseconds, both of which can be set at the generator 6 and applied to the machining gap G without power loss. A succession of machining pulses with such short $\tau$on and $\tau$off are capable of producing finely divided electrical discharges which prevent the workpiece surface from rough material removal and thus enable precision machining. Furthermore, with a discharge pulse repetitively created with a short interval, the machining gap G allows a next discharge to take place before its completes deionization from the previous discharge. This effectively avoids misfiring with each individual pulse so that an enhanced discharge repetition rate is achieved and with each individual discharge contributing to material removal with maximum effectiveness, a high-speed and high-efficiency machining process ensues.

Figure 2:
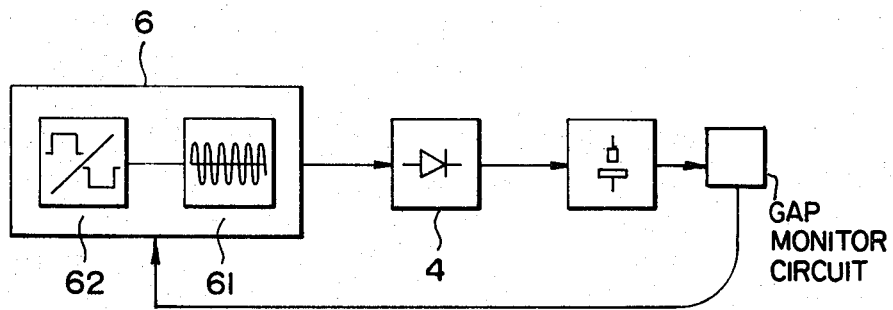
FIG. 2 is a schematic diagram illustrating a modified form of a generator for embodying the invention.
Figure 3:
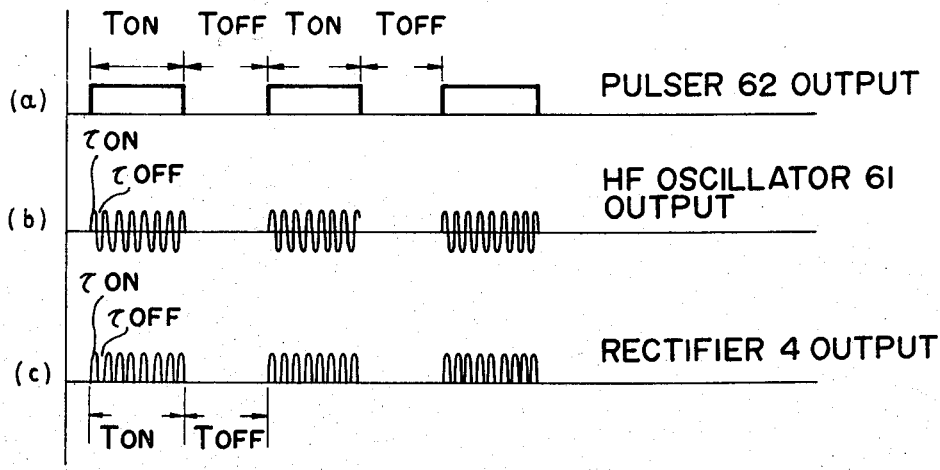
FIG. 3, curves (a), (b) and (c) are waveform diagrams schematically illustrating electric voltage or current waveforms appearing at portions of the circuit of FIG. 2.

A preferred embodiment of the high-frequency generator 6 is shown in FIG. 2 with a high-frequency AC oscillator designated therein at 61. This embodiment additionally includes a pulser 62 designed to provide a series of pulses of relatively long ON time Ton and Off time Toff as shown in FIG. 3(a) and to recurrently interrupt therewith the high-frequency AC output of 1 KHz to 5 MHz provided by the oscillator 61 so that the output of the generator 6 furnishes successive trains of high-frequency alternating pulses as shown in FIG. 3(b). The successive trains are transmitted along the feeder 7 to the rectifier 4 where to be converted to successive trains of unidirectional pulses as shown in FIG. 3(c) for application across the machining gap G disposed proximal thereto. Unit pulses which constitute each train in this embodiment may have a pulse duration $\tau$on=1 to 100 $\mu$s and a pulse interval $\tau$off=0.5 to 50 $\mu$s and, together with the frequency f thereof, are defined at the high-frequency AC oscillator 61, as mentioned previously. When the rectifier 4 is of half-wave rectification, the pulse duration and interval becomes $\tau$on=$\tau$off and when it is of full-wave, the relationship $\tau$on>>$\tau$off results. The oscillator 61 may also be adapted to produce an asymmetrical AC which is obtainable, for example, by superimposing a symmetrical AC of the adjustable frequency upon a biasing DC, in which case any desired combinations of the pulse duration and interval having a relation either $\tau$on>$\tau$off or $\tau$on<$\tau$off may be provided as required in accordance with a particular electrode material combination and machining conditions.

As a consequence, trains of pulses are shown in FIG. 3(c) with each train comprising a series of unit pulses having a pulse duration $\tau$on and interval $\tau$off and recurrent at a frequency f are provided at a relatively long ON time Ton and OFF time Toff and recurrent at a frequency F across the machining gap G between the tool electrode 1 and the workpiece 2 to permit machining at an increased efficiency as described previously. The ON time Ton and Off time Toff may each range between 10 microseconds and 100 milliseconds while the frequency F of the trains may range between 100 Hz and 100 KHz, these train parameters being chosen according to particular machining conditions and settings.

A gap sensor may be provided to monitor the machining state or condition at the gap G by responding to one or more of gap variables such as gap voltage, current and impedance on an average basis or an instantaneous basis within each pulse train or between adjacent pulse trains, together with a pulse parameter controller responsive to the gap sensor for controlling one or more of Ton, Toff and F as controllable train parameters. Of course, parameters τon, τoff and/or f of unit pulses within each train may simultaneously be controlled as desired with an additional controller associated with the oscillator 61 as described earlier.

The control of pulse train parameters is such as to decrease the ON time Ton and/or to increase the OFF time Toff and, in other words, to decrease the number of unit pulses within each train and/or to increase the period in which the unit pulses are interrupted in each recurring cycle of unit pulse trains, when the gap sensor indicates worsening or degeneration of the machining state requiring a correction or recovery in response to the gap variables. Thus, discharge-produced machining chips, tar and gases accumulated or excessively remaining in the machining gap are effectively carried away during increased OFF times and decreased ON times to maintain the gap at an optimum stage which allows machining discharges to be created at stability with successive unit pulse trains. It is also desirable to control the average machining current by modifying train ON time and/or OFF time to allow diverse machining operations from high-speed to slow machining or in response to change in the machining area across which the tool electrode and the workpiece are juxtaposed. In the arrangement of FIG. 2, the high-frequency oscillator 61 is permitted to oscillate when and every time the ON signal is incoming at its input from the pulser 62. This arrangement may be altered by any of other possible forms. For example, an AND or coincidence circuit may be provided having a first input fed from a continuously operating oscillator corresponding to the unit 61 and a second input fed from a pulser corresponding to the unit 62 so that at its output the high-frequency AC power with the waveform illustrated at FIG. 3(b) is likewise furnished by the generator 6.

Figure 4:
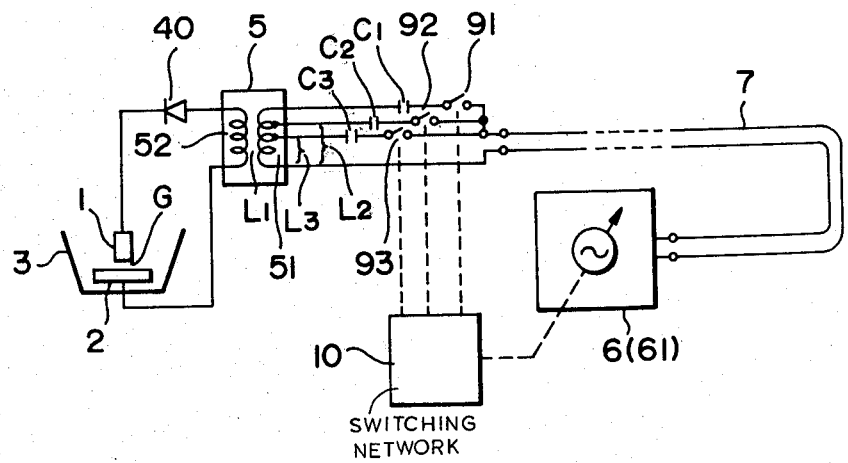
FIG. 4 is a circuit diagram schematically illustrating a further modified embodiment according to the present invention.

FIG. 4 illustrates a modification of the embodiment of FIG. 2. Here, a unidirectional current conducting element 40 which corresponds to the unit 4 of the previous embodiment is constituted by a half-wave rectifier. In addition, a step-down transformer 5 has its primary winding 51 provided with a plurality of taps having a corresponding number of capacitors C1, C2 and C3 connected respectively in series with switches 91, 92 and 93 selectively set on by a switching network 10. In this arrangement, the capacitors C1, C2 and C3 respectively along with tapped inductances L1, L2 and L3 of the primary winding 51 of the transformer constitute resonant networks having different resonance frequencies connected in parallel with one another and in series with the feeder 7. These resonant networks are selectively set in by the switching network 10 which also has a function to adjust the operating frequency of the oscillator 6(61) in gang with the switches 91, 92 and 93. Thus, by setting into circuit a particular resonant network C1-L1, C2-L2, C3-L3 of a resonant frequency in tune with the adjusted operating frequency of the oscillator 6(61) with the corresponding switch 91, 92, 93, resonance is created to allow the AC output of the oscillator 6(61) with an intensified magnitude to be fed to the transformer 5 and hence to the machining gap G with a further reduced loss of power.

There is thus provided an improved high-frequency power feeder circuitry as well as its supply method for electrical discharge machining, assuring better machining results while conveniently rendering the entire power supply unit compact and simplified.

I claim:

1. A method of supplying high-frequency electrical discharge machining pulses between a tool electrode and a workpiece across a machining gap flushed with a machining fluid, comprising the steps of:
   generating a high-frequency alternating electric power in a high-frequency generator unit disposed remote from said machining gap;
   transmitting said high-frequency alternating electric power to a region immediately proximal to said machining gap along a coaxial feeder cable having inlet terminals directly leading from said unit and outlet terminals having a primary winding of a transformer in said region;
   transforming the transmitted high-frequency alternating electric power to produce a transformed high-frequency alternating electric power at a secondary winding of said transformer in said region;
   rectifying directly said transformed high-frequency alternating electric power by a rectifier disposed in said region and connected directly to said electrode and said workpiece via respective conductors of a minimum length to form a succession of pulses of a given polarity relative to said tool electrode and said workpiece, constituting said electrical discharge machining pulses; and
   dimensioning said conductors and the distance of said region from said gap such that there is little loss of power due to stray resistance and inductance in said conductors and the pulse waveform across said gap is substantially free from distortion.

2. The method defined in claim 1 wherein said high-frequency alternating electric power has a frequency in the range between 1 KHz and 5 MHz.

3. The method defined in claim 1 wherein said high-frequency alternating electric power is in the form of intermittently occurring successions of a high-frequency alternating current.

4. The method defined in claim 3 wherein the duration of said alternating current in each succession and the time interval thereof between adjacent successions have each a time duration in the range 10 microseconds and 100 milliseconds.

5. The method defined in claim 3, further comprising variably setting at least one of said duration and time interval.

6. The method defined in claim 5, further comprising variably setting at least one of said duration, time interval and the frequency of said alternating electric power in accordance with a predetermined machining setting adapted to achieve a desired machining result.

7. The method defined in claim 5, further comprising the step of modifying at least one of said duration, said time interval and the frequency of said alternating electric power in response to a state of said machining gap during a given course of machining operation.

8. The method defined in claim 1, further comprising variably setting the frequency of said high-frequency alternating electric power.

9. The method as defined in claim 1, further comprising the step of bringing said electric power into resonance in said region at a particular frequency.

10. A circuit arrangement for supplying high-frequency electrical discharge machining pulses between a tool electrode and a workpiece across a machining gap flushed with a machining fluid comprising:

unidirectional current conducting means disposed in a region immediately proximal to said machining gap and connected directly to said tool electrode and said workpiece with respective conductors of a minimum length;

a transformer disposed in said region and having a primary winding and a secondary winding, said secondary winding being directly connected to said unidirectional current conducting means;

a high frequency alternating power generator unit disposed remote from said machining gap and spaced from said region with a distance for a providing a high-frequency alternating power; and a coaxial feeder cable connecting directly said generator unit and said primary winding of transformer across said distance for transmitting said high-frequency alternating power to said region and permitting it to be transformed at said transformer in said region, said unidirectional current conducting means being adapted to rectify the transformed high-frequency alternating electric power in said region to form a succession of pulses of a given polarity relative to said tool electrode and said workpiece, constituting said electrical discharge machining pulses.

11. A circuit arrangement for supplying high-frequency electrical discharge machining pulses between a tool electrode and a workpiece across a machining gap flushed with a machining fluid comprising:

unidirectional current conducting means disposed in a region immediately proximal to said machining gap and connected directly to said tool electrode and said workpiece with respective conductors of a minimum length;

a transformer disposed in said region and having a primary winding and a secondary winding, said secondary winding being directly connected to said unidirectional current conducting means;

a high-frequency alternating power generator unit disposed remote from said machining gap and spaced from said region with a distance for providing a high-frequency alternating power; and a coaxial feeder cable connecting directly said generator unit and said primary winding of transformer across said distance for transmitting said high-frequency alternating power to said region and permitting it to be transformed at said transformer in said region, said unidirectional current conducting means being adapted to rectify the transformed high-frequency alternating electric power in said region to form a succession of pulses of a given polarity relative to said tool electrode and said workpiece, constituting said electrical discharge machining pulses, said minimum length and the proximity of said region to said gap being such that the conductors leading to said gap are free from significant loss of power due to stray resistance and inductance and that the pulse waveform across said gap is substantially free from distortion.

12. The circuit arrangement defined in claim 10 wherein said high-frequency generator unit has an output frequency in the range between 1 KHz and 5 MHz.

13. The circuit arrangement defined in claim 10 wherein said generator unit includes a source of high-frequency alternating current and a pulser operating at a low frequency and associated with said source for providing time-spaced successions of said high-frequency alternating current constituting said high-frequency alternating power.

14. The circuit arrangement as defined in claim 13, said generator unit further comprising means associated with said pulser for modifying the time interval of adjacent successions of said high-frequency alternating current.

15. The circuit arrangement as defined in claim 13, said generator unit further comprising means associated with said pulser for modifying the duration of each succession of said high-frequency alternating current.

16. The circuit arrangement as defined in claim 13, said generator unit further comprising means associated with said source for modifying the frequency of said high-frequency current.

17. The circuit arrangement as defined in claim 14, claim 15 or claim 16, further comprising means responsive to a state of said machining gap during a given course of machining operation for controlling at least one of said means to modify at least one of said frequency of the high-frequency alternating current, and duration and time interval of said successions thereof.

* * * * *